United States Patent
McNeil et al.

(10) Patent No.: US 7,610,809 B2
(45) Date of Patent: Nov. 3, 2009

(54) DIFFERENTIAL CAPACITIVE SENSOR AND METHOD OF MAKING SAME

(75) Inventors: Andrew C. McNeil, Chandler, AZ (US); Yizhen Lin, Gilbert, AZ (US); Todd F. Miller, Scottsdale, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 218 days.

(21) Appl. No.: 11/655,557

(22) Filed: Jan. 18, 2007

(65) Prior Publication Data
US 2008/0173091 A1   Jul. 24, 2008

(51) Int. Cl.
*G01P 15/125* (2006.01)
(52) U.S. Cl. .................................. 73/514.32
(58) Field of Classification Search ............. 73/514.32, 73/514.36, 514.38, 514.29, 514.16
See application file for complete search history.

(56) References Cited

U.S. PATENT DOCUMENTS

| | | | |
|---|---|---|---|
| 4,736,629 A | 4/1988 | Cole | |
| 5,146,389 A | 9/1992 | Ristic et al. | |
| 5,181,156 A | 1/1993 | Gutteridge et al. | |
| 6,230,566 B1 * | 5/2001 | Lee et al. | 73/514.32 |
| 6,841,992 B2 * | 1/2005 | Yue et al. | 324/162 |
| 6,845,670 B1 | 1/2005 | McNeil et al. | |
| 6,935,175 B2 * | 8/2005 | Eskridge et al. | 73/514.32 |
| 7,022,543 B2 | 4/2006 | Eskridge et al. | |
| 7,119,550 B2 | 10/2006 | Kitano et al. | |
| 7,121,141 B2 * | 10/2006 | McNeil | 73/514.32 |
| 7,426,863 B2 * | 9/2008 | Kuisma | 73/514.32 |
| 2005/0109109 A1 | 5/2005 | Eskridge et al. | |
| 2005/0145029 A1 | 7/2005 | Stewart | |
| 2005/0268719 A1 | 12/2005 | Malametz | |

OTHER PUBLICATIONS

International Search Report and Written Opinion, Jun. 2008.

* cited by examiner

*Primary Examiner*—Helen C. Kwok
(74) *Attorney, Agent, or Firm*—Meschkow & Gresham, PLC

(57) ABSTRACT

A differential capacitive sensor (50) includes a movable element (56) pivotable about a rotational axis (60). The movable element (56) includes first and second sections (94, 96). The first section (94) has an extended portion (98) distal from the rotational axis (60). A static layer (52) is spaced away from a first surface (104) of the moveable element (56), and includes a first actuation electrode (74), a first sensing electrode (64), and a third sensing electrode (66). A static layer (62) is spaced away from a second surface (106) of the moveable element (56) and includes a second actuation electrode (74), a second sensing electrode (70), and a fourth sensing electrode (72). The first and second electrodes (64, 70) oppose the first section (94), the third and fourth electrodes (66, 72) oppose the second section (96), and the first and second electrodes (68, 74) oppose the extended portion (98).

14 Claims, 4 Drawing Sheets

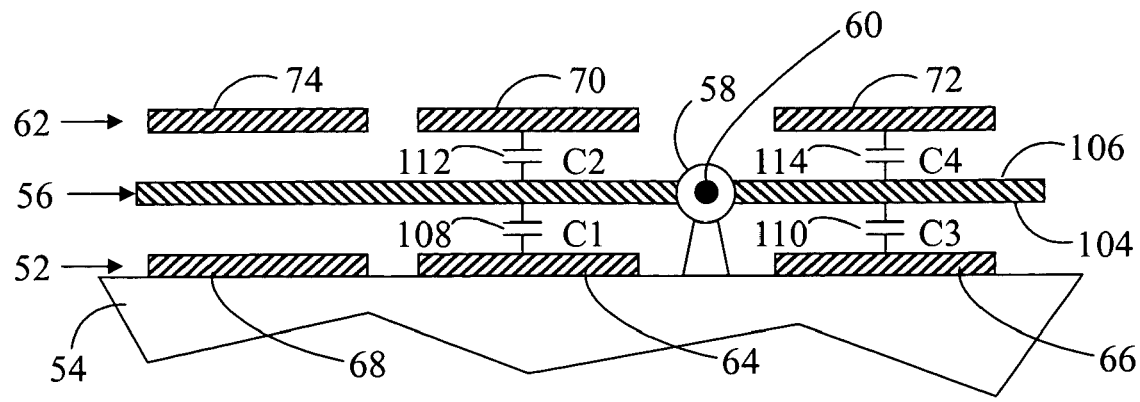

FIG. 5

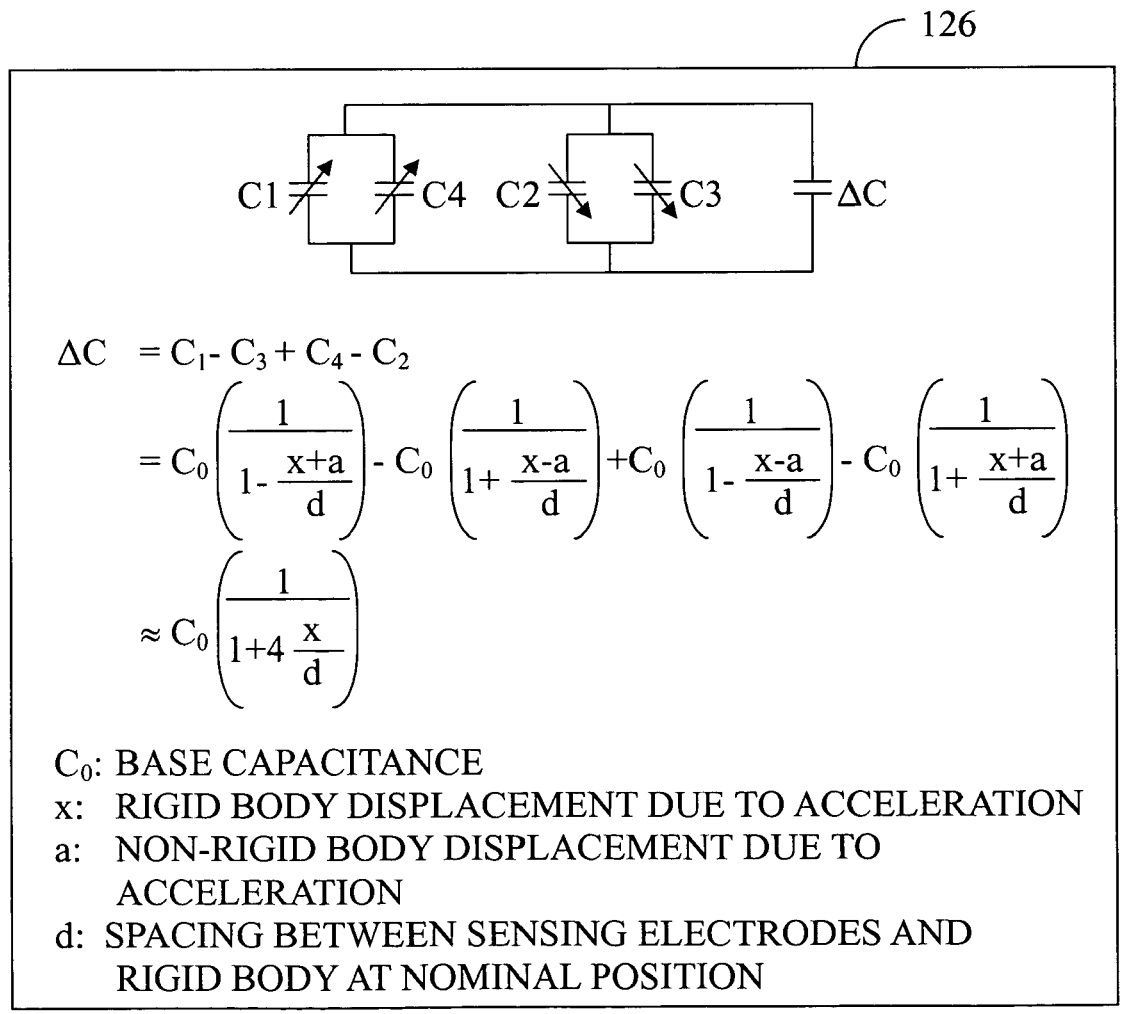

$\Delta C = C_1 - C_3 + C_4 - C_2$ $= C_0 \left( \dfrac{1}{1 - \dfrac{x+a}{d}} \right) - C_0 \left( \dfrac{1}{1 + \dfrac{x-a}{d}} \right) + C_0 \left( \dfrac{1}{1 - \dfrac{x-a}{d}} \right) - C_0 \left( \dfrac{1}{1 + \dfrac{x+a}{d}} \right)$ $\approx C_0 \left( \dfrac{1}{1 + 4 \dfrac{x}{d}} \right)$ $C_0$: BASE CAPACITANCE
x: RIGID BODY DISPLACEMENT DUE TO ACCELERATION
a: NON-RIGID BODY DISPLACEMENT DUE TO ACCELERATION
d: SPACING BETWEEN SENSING ELECTRODES AND RIGID BODY AT NOMINAL POSITION

FIG. 6

DIFFERENTIAL CAPACITIVE SENSOR AND METHOD OF MAKING SAME

TECHNICAL FIELD OF THE INVENTION

The present invention relates generally to micro electromechanical systems (MEMS) sensors. More specifically, the present invention relates to a MEMS differential capacitive accelerometer.

BACKGROUND OF THE INVENTION

An accelerometer is a sensor typically utilized for measuring acceleration forces. These forces may be static, like the constant force of gravity, or they can be dynamic, caused by moving or vibrating the accelerometer. An accelerometer may sense acceleration or other phenomena along one, two, or three axes or directions. From this information, the movement or orientation of the device in which the accelerometer is installed can be ascertained. Accelerometers are used in inertial guidance systems, in airbag deployment systems in vehicles, in protection systems for a variety of devices, and many other scientific and engineering systems.

Capacitive-sensing MEMS accelerometer designs are highly desirable for operation in high gravity environments and in miniaturized devices, and due to their relatively low cost. Capacitive accelerometers sense a change in electrical capacitance, with respect to acceleration, to vary the output of an energized circuit. One common form of accelerometer is a two layer capacitive transducer having a "teeter-totter" or "see saw" configuration. This commonly utilized transducer type uses a movable element or plate that rotates under z-axis acceleration above a substrate. The accelerometer structure can measure two distinct capacitances to determine differential or relative capacitance.

FIG. 1 shows an exploded side view of a prior art three-layer capacitive accelerometer 20 constructed as a conventional hinged or "teeter-totter" type sensor. Capacitive accelerometer 20 includes a pair of static substrates 22 and 24, respectively, having opposed parallel planar faces. Substrates 22 and 24 are spaced from one another and each has a number of metal electrode elements 26 and 28 of a predetermined configuration deposited on one surface to form respective capacitor electrodes or "plates." In an exemplary scenario, electrode elements 26 operate as an excitation or sensing electrode to receive stimulating signals. The other electrode elements 28 operate as the feedback electrodes for electrostatic rebalance. A single set of electrode elements 26 (or 28) operates as both sensing and feedback electrodes when the feedback signal is superimposed on the sensing signal.

A movable element 30, commonly referred to as a "proof mass," is flexibly suspended between substrates 22 and 24 by one or more rotational flexures 32 situated at elevated attachment points 34 for rotation about a rotational axis 36 to form different sets of capacitors with electrodes 26 and 28. Movable element 30 moves in response to acceleration, thus changing its position relative to the static sensing electrodes 26. This change in position results in a set of capacitors whose difference, i.e., a differential capacitance, is indicative of acceleration. Another set of capacitors for electrostatic rebalance is made up of movable element 30 and feedback electrodes 28. Feedback electrodes 28 function to drive movable element 30 to its reference position balanced between the sensing elements 26 and maintain it there.

When intended for operation as a teeter-totter type accelerometer, a first section 38 of movable element 30 on one side of rotational axis 36 is formed with relatively greater mass than a second section 40 of movable element 30 on the other side of rotational axis 36. The greater mass of first section 38 is typically created by offsetting rotational axis 36 such that an extended portion 42 of first section 38 is formed distal from rotational axis 36. In addition, electrode elements 26 and 28 are sized and spaced symmetrically with respect to the longitudinal axis, L, of movable element 30. Similarly, electrode elements 26 and 28 are further sized and spaced symmetrically with respect to rotational axis 36.

Two- and three-layer capacitive sensors having a teeter-totter configuration suffer from a number of drawbacks. In order to provide more capacitive output and hence better circuit performance (e.g., lower noise) the teeter-totter type capacitive accelerometer calls for a relatively large proof mass. Unfortunately, a large proof mass requires more die area, hence increasing cost and package size. Moreover, a proof mass should rotate as a rigid body. The propensity for a proof mass to deform or bend increases in relation to its increasing size, especially when it is subjected to high acceleration. This deformation or bending causes a non-linearity effect that results in decreased accuracy of the sensor. For example, this nonlinearity can create DC offset in the sensor output and possibly cause dysfunction of the system in which the accelerometer is deployed. A smaller gap between the proof mass and the sensing electrodes or a thicker proof mass may mitigate the problem of deformation and the commensurate non-linearity effect. However, the manufacture of a smaller gap and/or a thicker proof mass leads to manufacturing issues.

A problem particular to the three-layer teeter-totter configuration shown in FIG. 1 is that both the sensing electrodes 26 and the feedback electrodes 28 are clustered proximate rotational axis 36. This configuration is inefficient in that the surface area of extended portion 42, generally termed a shield area, of movable element 30 is unused. Moreover, the surface areas of electrodes 26 and 28 are relatively small due to their clustered configuration about rotational axis 36. A smaller surface area of sensing electrodes 26 results in a lower capacitive output. A smaller surface area of feedback electrodes 28 provides insufficient actuation given voltage levels available from the feedback circuit (not shown).

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 5 shows a partial side view of the differential capacitive sensor;

FIG. 6 shows a table of a mathematical relationship between the capacitors of the differential capacitive sensor.

DETAILED DESCRIPTION

Figure 1:
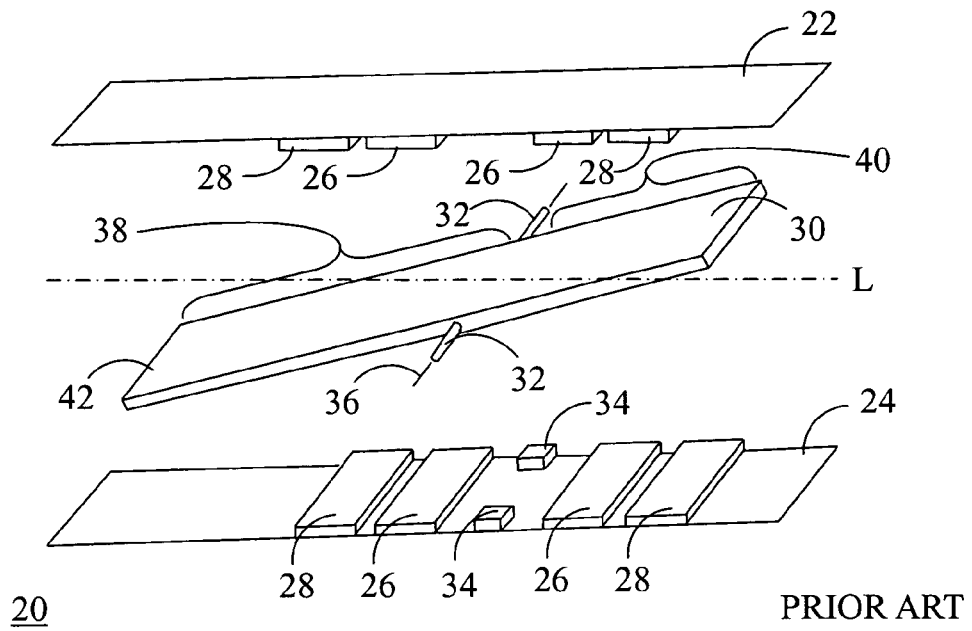
FIG. 1 shows an exploded side view of a prior art three-layer capacitive accelerometer 20 constructed as a conventional hinged or "teeter-totter" type sensor.
Figure 2:
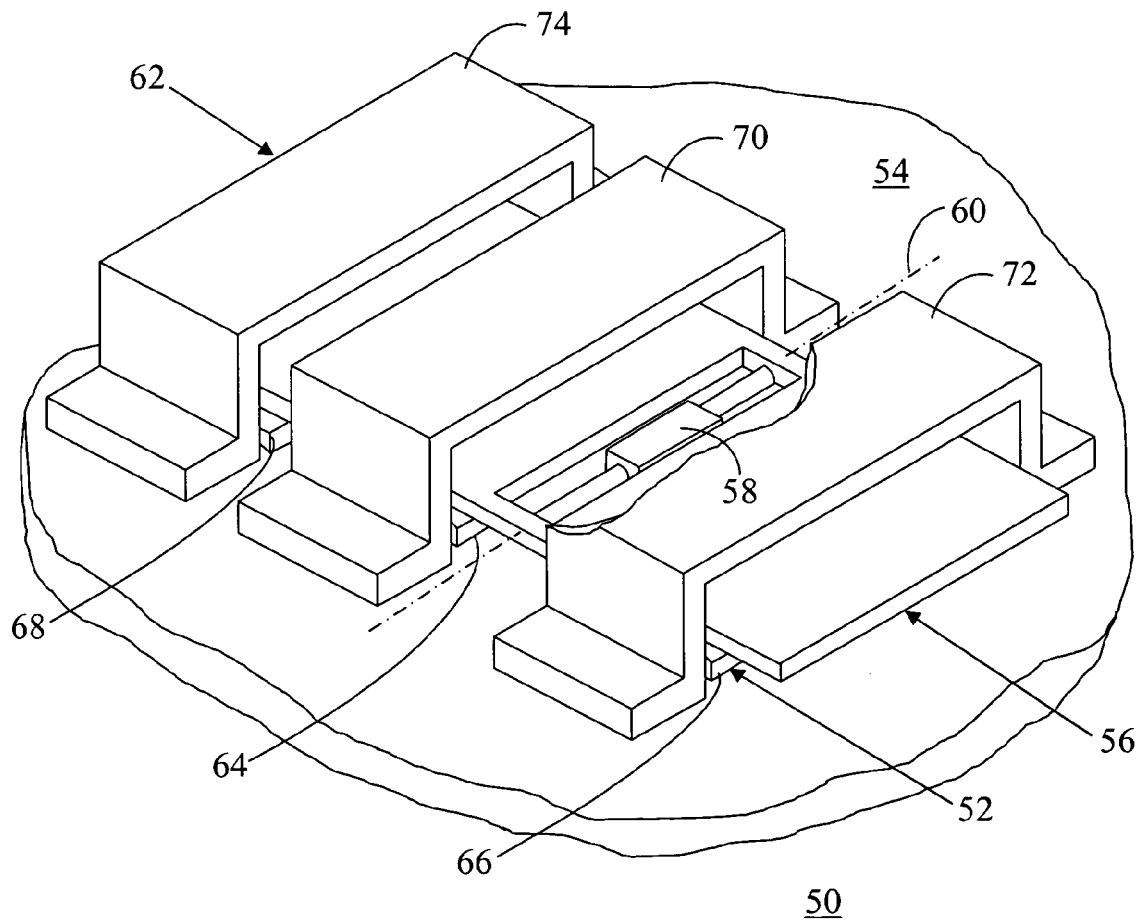
FIG. 2 shows a perspective view of a differential capacitive sensor in accordance with the present invention.

FIG. 2 shows a perspective view of a differential capacitive sensor 50 in accordance with the present invention. Sensor 50 may be, for example, a Micro Electro-Mechanical Systems (MEMS) accelerometer or other MEMS sensing device. For purposes of the following discussion, sensor 50 is referred to hereinafter as capacitive accelerometer 50. Capacitive accelerometer 50 is in a three-layer, teeter-totter configuration that provides more capacitive output than prior art devices, effectively cancels the non-linearity effect caused by non-rigid body deformation, and allows for sufficient electrostatic actuation that may be used for self test and/or for a "closed loop" or feedback design.

Capacitive accelerometer 50 includes a first static-conductive layer 52 disposed on a substrate 54. Another conductive layer, referred to herein as a movable element 56 is formed above first conductive layer 52. Movable element 56 is supported by a hinge element 58 and is allowed to pivot about a rotational axis 60 defined by hinge element 58. A second static conductive layer 62 is disposed above movable element 56. It should be understood that a number of flexures, hinges, and other rotational mechanisms may be utilized to enable pivotal movement of movable element 56 about rotational axis 60.

First static conductive layer 52 is in the form of three electrically isolated electrodes or plates, including a first sensing electrode 64, a third sensing electrode 66, and a first actuation electrode 68. Second static conductive layer 62 is in the form of three electrically isolated plates or caps rigidly secured to substrate 54 and disposed over first conductive layer 52 and movable element 56. The caps include a second sensing electrode 70, a fourth sensing electrode 72, and a second actuation electrode 74. A portion of fourth sensing electrode 72 has been cut away to reveal hinge element 58 of movable element 56.

FIG. 2 shows one possible configuration of differential accelerometer 50. However, it should be understood that the three-layers of differential accelerometer 50 can take on a number of forms that maintain each of first, second, third, and fourth sensing electrodes 64, 70, 66, and 72, as well as first and second actuation electrodes 68 and 74, electrically isolated from one another.

Figure 3:
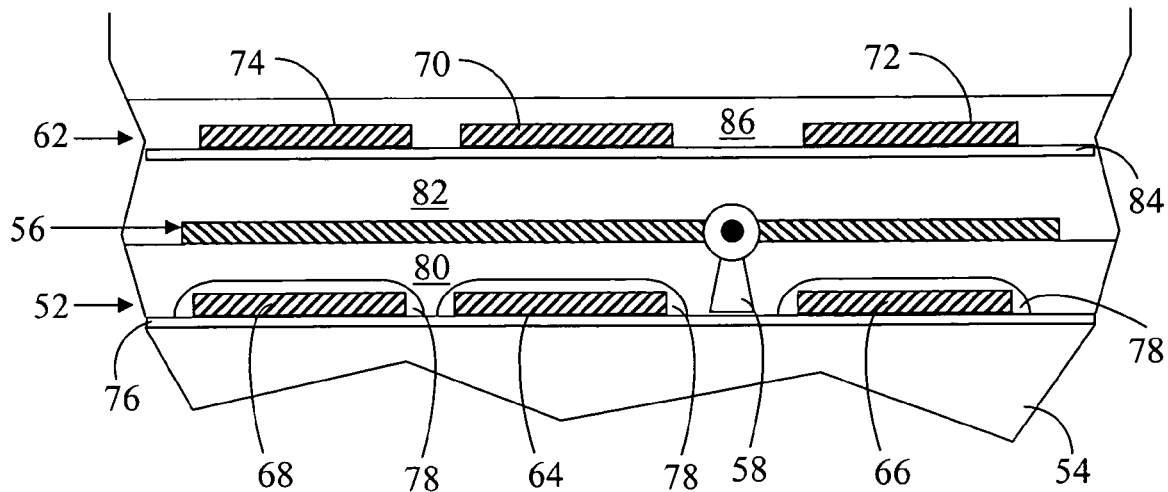
FIG. 3 shows a highly enlarged cross-sectional view of a portion of the differential capacitive sensor during processing in accordance with the present invention.

FIG. 3 shows a highly enlarged cross-sectional view of a portion of differential accelerometer 50 during processing in accordance with the present invention. Substrate 54 may be a semiconductor wafer comprising silicon, although any mechanically supporting substrate may be utilized. An insulating layer 76 may be formed on the surface of substrate 54. Insulating layer 76 may be silicon dioxide, silicon nitride, and the like. Insulating layer 76 may be formed conformally and then patterned and etched. It functions to insulate first conductive layer 52 from substrate 54. It should be understood, however, that if substrate 54 is nonconductive, insulating layer 76 may not be utilized.

First static conductive layer 52 comprises polysilicon, although other conductive materials may be employed. First conductive layer 52 may be formed by known methods such as deposition and sputtering. First conductive layer 52 may be deposited over the surface of substrate 54 as a blanket layer and can then be patterned and etched to form first sensing electrode 64, third sensing electrode 66, and first actuation electrode 68 of first conductive layer 52. A first protective layer 78 may optionally be disposed over first conductive layer 52 and patterned and etched as desired to protect substrate 54 during future processing steps and to prevent shorting and/or welding between first conductive layer 52 and movable element 56.

A first sacrificial layer 80 may be formed on the patterned and etched first conductive layer 52. Like previous layers, first sacrificial layer 80 is also formed conformally and then patterned and etched as desired. First sacrificial layer 80 may be formed of phosphosilicate glass and can be deposited by chemical vapor deposition, as known to those skilled in the art. It should be understood that other sacrificial materials may be employed in lieu of phosphosilicate glass.

The next conductive layer, i.e., movable element 56, comprises polysilicon and is formed as a teeter-totter structure positioned over first conductive layer 52. Movable element 56 is mechanically attached to substrate 54 by hinge element 58. A second sacrificial layer 82, such as phosphosilicate glass, may be formed conformally on movable element 56 and then patterned and etched. A second protective layer 84 may optionally be formed on second sacrificial layer 82 to prevent shorting and/or welding between movable element 56 and second static conductive layer 62.

Second static conductive layer 62 is formed on the patterned second sacrificial layer 82. Second conductive layer 62 also comprises polysilicon and is formed conformally and then patterned and etched accordingly to form second sensing electrode 70, fourth sensing electrode 72, and second actuation electrode 74. Following the formation of second static conductive layer 62, a protective layer 86 may be formed to protect second conductive layer 62.

Following the formation of the above described structure, first and second sacrificial layers 80 and 82, respectively, are removed in accordance with conventional procedures. For example, a selective etchant may be employed that can remove the phosphosilicate glass sacrificial layers without appreciably damaging the polysilicon of first static conductive layer 52, movable element 56, and second static conductive layer 62 or protective layers 78, 84, and 86.

Figure 4:
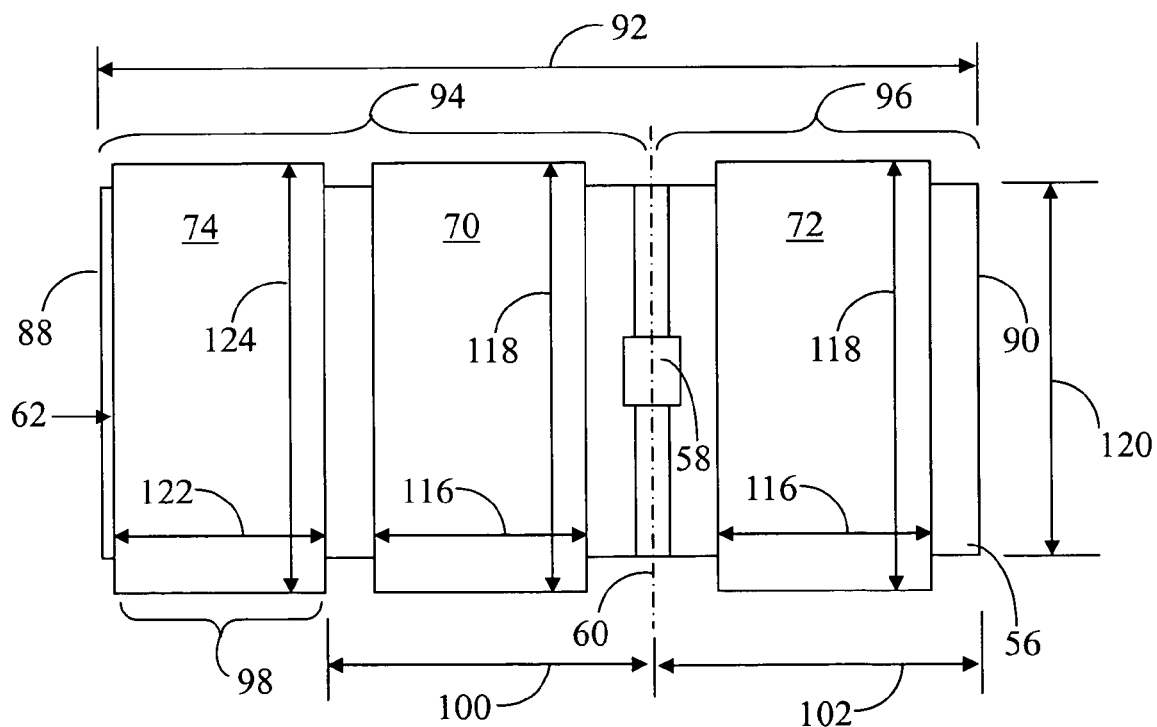
FIG. 4 shows a top view of the differential capacitive sensor.

FIG. 4 shows a top view of the differential capacitive sensor, i.e., capacitive accelerometer 50. Movable element 56 underlies second sensing electrode 70, fourth sensing electrode 72, and second actuation electrode 74 of second static conductive layer 62. First sensing electrode 64, third sensing electrode 66, and first actuation electrode 68 of first static conductive layer 52 underlie movable element 56 and are not visible in FIG. 4.

Movable element 56 is adapted for motion relative to rotational axis 60 which is offset between a first end 88 and a second end 90 of movable element 56. Rotational axis 60 is oriented perpendicular to a longitudinal dimension 92 of movable element 56. A first section 94 of movable element 56 is formed between rotational axis 60 and first end 88, and a second section 96 of movable element 56 is formed between rotational axis 60 and second end 90. First section 94 of movable element 56 is formed with relatively greater mass than second section 96 by offsetting rotational axis 60 such that an extended portion 98 is formed distal from rotational axis 60. In one embodiment, extended portion 98 of first section 94 is spaced away from rotational axis 60 at a distance 100 that is approximately equivalent to a length 102 of second section 96.

Referring to FIGS. 4-5, FIG. 5 shows a partial side view of the differential capacitive sensor, i.e., capacitive accelerometer 50. Movable element 56 includes a first surface 104 and a second surface 106. First static conductive layer 52 is spaced away from first surface 104 of movable element 56 and second static conductive layer 62 is spaced away from second surface 106.

First sensing electrode 64, third sensing electrode 66, and first actuation electrode 68 oppose first surface 104 of movable element 56. Similarly, second sensing electrode 70, fourth sensing electrode 72, and second actuation electrode 74 oppose second surface 106 of movable element 56. More particularly, first and second sensing electrodes 64 and 70, respectively, oppose opposite surfaces of first section 94 of movable element 56 in close proximity to rotational axis 60. Similarly, third and fourth sensing electrodes 66 and 72, respectively, oppose opposite surfaces of second section 96 in close proximity to rotational axis 60.

First sensing electrode 64 forms a first capacitor 108 with first section 94 of movable element 56, and third sensing electrode 66 forms a third capacitor 110 with second section 96 of movable element 56. In addition, second sensing electrode 70 forms a second capacitor 112 with first section 94 of movable element 56 and fourth sensing electrode 72 forms a fourth capacitor 114 with second section 96 of movable element.

First and third sensing electrodes 64 and 66, respectively, are symmetrically arranged relative to rotational axis 60, and second and fourth sensing electrodes 70 and 72 are symmetrically arranged relative to rotational axis 60. Each of electrodes 64, 66, 70, and 72 are generally equivalent in size and shape. First actuation electrode 68 is adjacent first sensing electrode 66, but is located distal from rotational axis 60 to oppose extended portion 98 of first section 94. Likewise, second actuation electrode 74 is adjacent second sensing electrode 70, but is located distal from rotational axis 60 to oppose extended portion 98 of first section 94. First and second actuation electrodes 68 and 74, respectively, are advantageously incorporated into the unused shield area of unbalanced proof mass implementations without a commensurate increase in the die area of such a device.

Placement of first and second actuation electrodes 68 and 74, respectively, at extended portion 98 allows for greater surface areas of electrodes 64, 66, 70, and 72, hence higher capacitive output of first, second, third, and fourth capacitors 108, 112, 110, and 114, respectively, over prior art designs. For example, a surface area (i.e., a first dimension 116 multiplied by a second dimension 118) of each of electrodes 64, 66, 70, and 72 is in a range of approximately twenty-five to thirty-five percent of the overall surface area (i.e. length 92 multiplied by a width 120) of movable element 56 for desirable performance. Since there are two sensing electrodes on each side of movable element 56, approximately fifty to seventy percent of each of first and second surfaces 104 and 106, respectively, is utilized by their respective sensing electrodes 64, 66, 70, and 72. In other words, each of the sensing electrodes on a given side of movable element 56 comprises a surface area in a range of twenty-five to thirty-five percent of an overall surface area of the given side of movable element 56.

In addition, the placement of first and second actuation electrodes 68 and 74 at extended portion 98 also allows for relatively large surface areas of first and second actuation electrodes 68 and 74. For example, a surface area (i.e., a third dimension 122 multiplied by a fourth dimension 124) of each of first and second actuation electrodes 68 and 74, respectively, is in a range of approximately twenty to twenty-five percent of the overall surface area of movable element 56. Placement of first and second actuation electrodes 68 and 74 at extended portion is a desirable location for actuation because extended portion 98 is farther from rotational axis 60 and thus provides a large moment.

First and second actuation electrodes 68 and 74 provide actuation for feedback "closed-loop" operation and/or for "self test" operation. For feedback operation, they provide ability to counteract large acceleration. Thus, in feedback operation, a feedback signal can be applied to first and second electrodes 68 and 74 to sense the position of the movable element with capacitance and provide electrostatic bias to the actuation electrodes to keep the movable element stationary, or to restrict movement in certain frequency ranges. For example, movement may be restricted to allow high frequency movement but to counteract low-frequency movement, such as any temperature and/or time dependent offset caused by package stress. For "self test" operation they can provide a large amount of actuation to test the function of differential accelerometer 50. Moreover in both cases, the actuation is bi-directional, i.e. movable element 56 can be rotated in either direction.

This configuration results in an efficient use of an entirety of the surface area of movable element 56. Moreover, this configuration allows for a smaller proof mass, i.e., movable element 56, while enabling significant capacitive output of capacitors 108, 112, 110, and 114 and allowing for a sufficient actuation voltage at first and second actuation electrodes 68 and 74, respectively.

FIG. 6 shows a table 126 of a mathematical relationship between first, second, third, and fourth capacitors 108, 112, 110, and 114 of differential accelerometer 50 (FIG. 2). An acceleration which causes movable element 56 (FIG. 5) to pivot about rotational axis 60 so that first section 94 moves closer to first sensing element 64 and second section 96 moves closer to fourth sensing element 72 will result in a measured increase in both of first and fourth capacitors 108 and 114, respectively, and a measured decrease in both of second and third capacitors 112 and 110, respectively. Thus, a differential sense scheme is formed. Since first and fourth capacitors 108 and 114 are connected, and second and third capacitors 112 and 110 are connected, differential accelerometer 50 provides about twice the base capacitance, $C_O$, and about twice the delta capacitance, $\Delta C$, under a given acceleration than a conventional two-layer teeter-totter configuration. In addition, this differential sense scheme cancels the second order nonlinear term found in two-layer teeter-totter designs caused by non-rigid proof mass deformation.

Figure 7:
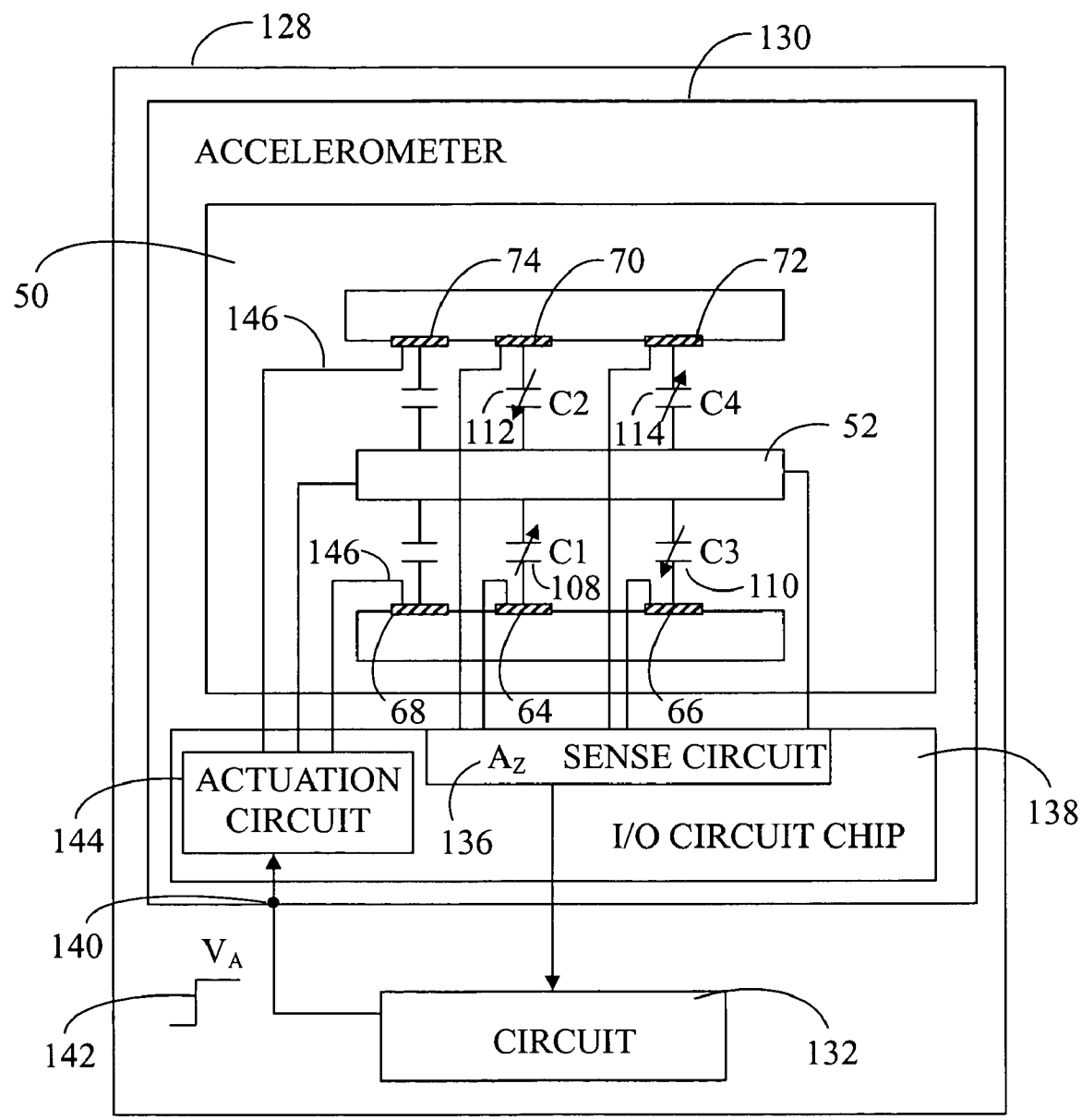
FIG. 7 shows a device in which the differential capacitive sensor may be installed.

FIG. 7 shows a device 128 in which differential accelerometer 50 may be installed. Device 128 can be any of a number of devices such as an inertial guidance system, an airbag deployment system in a vehicle, a protection system for a variety of devices, and many other scientific and engineering systems. Device 128 includes an accelerometer package 130 into which differential accelerometer 50 is incorporated. In this exemplary situation, accelerometer package 130 is in communication with a circuit 132, which may include, for example, a processor, hard disk drive, and other components that are interconnected via conventional bus structures known to those skilled in the art. Those skilled in the art will recognize that device 128 may include many other components that are not discussed herein for brevity. Furthermore, device 128 need not have the structures specified herein.

In general, circuit 132 monitors signals from accelerometer package 130. These signals include acceleration along the Z axis. Differential accelerometer 50 of accelerometer package 130 senses a Z axis acceleration ($A_z$) 136. In accordance with the present invention, Z axis acceleration 136 is produced by capacitances from first, second, third, and fourth capacitors 108, 112, 110, and 114 as discussed in connection with FIG. 6. The capacitance signals from differential accelerometer 50 are communicated to a sense circuit of an input/output circuit chip 138 for suitable processing, as known to those skilled in the art, prior to output to circuit 132.

Accelerometer package 130 further includes an actuation voltage input port 140 in communication with circuit 132 for application of a digital input voltage signal 142. Voltage signal 142 signals an actuation circuit 144 of I/O circuit chip 138 to provide an actuation voltage (V+ and V−) 146 at first and second actuation electrodes 68 and 74, respectively. When differential accelerometer 50 is configured as a "closed loop" design, actuation voltage 146 is a feedback voltage. The feedback voltage can be applied to first and second electrodes 68 and 74 to cancel any temperature and/or time dependent offset caused by package stress such that a position of movable element 52 is substantially constant. Alternatively, actuation voltage may be a self test voltage when accelerometer package 130 is placed in a self test mode. A self test voltage can be applied to first and second actuation electrodes 68 and 74 to test the function of differential accelerometer 50. Circuit 132 may additionally be in communication with a port (not shown) external to device 128 so that an external input signal may be communicated to circuit 132. Processor software or hardware on circuit 132 subsequently generates voltage signal 142, which is conveyed to input port 140.

An embodiment described herein comprises a device that includes a differential capacitive sensor. Another embodiment comprises a method of fabricating the micro electro-mechanical systems differential capacitive sensor of the present invention. The sensor may be a differential accelerometer fabricated as a three-layer teeter-totter structure. Actuation electrodes are placed distal from the rotational axis of the teeter-totter structure so that relatively large sensing electrodes can be clustered proximate the rotational axis. In addition, relatively large actuation electrodes are positioned distal from the rotational axis of the movable element to take advantage of a large moment arm of the movable element. The configuration of sensing electrodes and feedback electrodes allows for the utilization of a smaller movable element (i.e., proof mass) that can be used to design a smaller package, lower cost sensor having sufficient capacitance and/or signal level. This smaller sensor will have less proof mass deformation, thus greater accuracy. The three-layer teeter-totter structure can also be used with feedback "closed loop" systems to sense the position of the movable element with capacitance and to provide electrostatic bias to the actuation electrodes to effectively cancel the non-linearity effect caused by non-rigid body deformation, and/or to provide sufficient electrostatic actuation for self test operation.

Although the preferred embodiments of the invention have been illustrated and described in detail, it will be readily apparent to those skilled in the art that various modifications may be made therein without departing from the spirit of the invention or from the scope of the appended claims. For example, the first and second actuation electrodes may be utilized as sensing electrodes in applications where no actuation is required. Under such a situation, the amount of capacitance output can be correspondingly increased.

What is claimed is:

1. A device comprising:
    a Micro Electro-Mechanical System (MEMS) sensor, said sensor comprising:
        a movable element adapted for motion relative to a rotational axis offset between first and second ends thereof to form a first section between said rotational axis and said first end and a second section between said rotational axis and said second end, said first section including an extended portion spaced away from said rotational axis at a distance approximately equivalent to a length of said second section between said rotational axis and said second end, and said movable element including a first surface and a second surface;
        a first static conductive layer spaced away from said first surface of said movable element, said first conductive layer including a first actuation electrode and a first sensing electrode; and
        a second static conductive layer spaced away from said second surface of said movable element, said second conductive layer including a second actuation electrode and a second sensing electrode, said first and second actuation electrodes opposing said extended portion.

2. A device as claimed in claim 1 wherein:
    said first and second sensing electrodes oppose said first section of said movable element;
    said first conductive layer includes a third sensing electrode; and
    said second conductive layer includes a fourth sensing electrode, said third and fourth sensing electrodes opposing said second section of said movable element.

3. A device as claimed in claim 2 wherein each of said third and fourth sensing electrodes has a surface area in a range of twenty-five to thirty-five percent of an overall surface area of said movable element.

4. A device as claimed in claim 2 wherein:
    said first and third sensing electrodes are symmetrically arranged relative to said rotational axis; and
    said second and fourth sensing electrodes are symmetrically arranged relative to said rotational axis.

5. A device as claimed in claim 2 wherein:
    said first and third sensing electrodes form respective first and third capacitors with said first and second sections of said movable element; and
    said second and fourth sensing electrodes form respective second and fourth capacitors with said first and second sections of said movable element.

6. A device as claimed in claim 1 wherein:
    said first and second sensing electrodes oppose said first section of said movable element;
    said first actuation electrode is adjacent to said first sensing electrode; and
    said second actuation electrode is adjacent to said second sensing electrode.

7. A device as claimed in claim 6 wherein:
    said first actuation electrode is electrically isolated from said first sensing electrode; and
    said second actuation electrode is electrically isolated from said third sensing electrode.

8. A device as claimed in claim 1 wherein a surface area of each of said first and second actuation electrodes is in a range of twenty to twenty-five percent of an overall surface area of said movable element.

9. A device as claimed in claim 1 wherein voltage is applied to said first and second actuation electrodes to test said sensor.

10. A device as claimed in claim 1 wherein voltage is applied to said first and second actuation electrodes to provide a balance force such that a position of said movable element is substantially constant.

11. A device as claimed in claim 1 wherein said first and second sensing electrodes are adapted to detect movement of said movable element along an axis perpendicular to a plane of said electrodes.

12. A Micro Electro-Mechanical System (MEMS) sensor comprising:
    a movable element adapted for motion relative to a rotational axis offset between first and second ends thereof to form a first section between said rotational axis and said first end and a second section between said rotational axis and said second end, said first section including an extended portion spaced away from said rotational axis at a distance approximately equivalent to a length of said second section between said rotational axis and said second end, and said movable element including a first surface and a second surface;

a first static conductive layer spaced away from said first surface of said movable element, said first conductive layer including a first actuation electrode, a first sensing electrode, and a third sensing electrode; and a second static conductive layer spaced away from said second surface of said movable element, said second conductive layer including a second actuation electrode, a second sensing electrode and a fourth sensing electrode, said first and second actuation electrodes opposing said extended portion, said first and second sensing electrodes opposing said first section, said third and fourth electrodes opposing said second section, and each of said first, second, third, and fourth sensing electrodes having a surface area in a range of twenty-five to thirty-five percent of an overall surface area of said movable element.

13. A sensor as claimed in claim 12 wherein each of said first and second actuation electrodes has a second surface area in a range of twenty to twenty-five percent of an overall surface area of said movable element.

14. A sensor as claimed in claim 12 wherein:
said first and third sensing electrodes are symmetrically arranged relative to said rotational axis; and
said second and fourth sensing electrodes are symmetrically arranged relative to said rotational axis.

* * * * *